March 28, 1933.   F. H. BENDER   1,902,823
TRUCK FRAME MOUNTING
Filed March 22, 1929   3 Sheets-Sheet 2
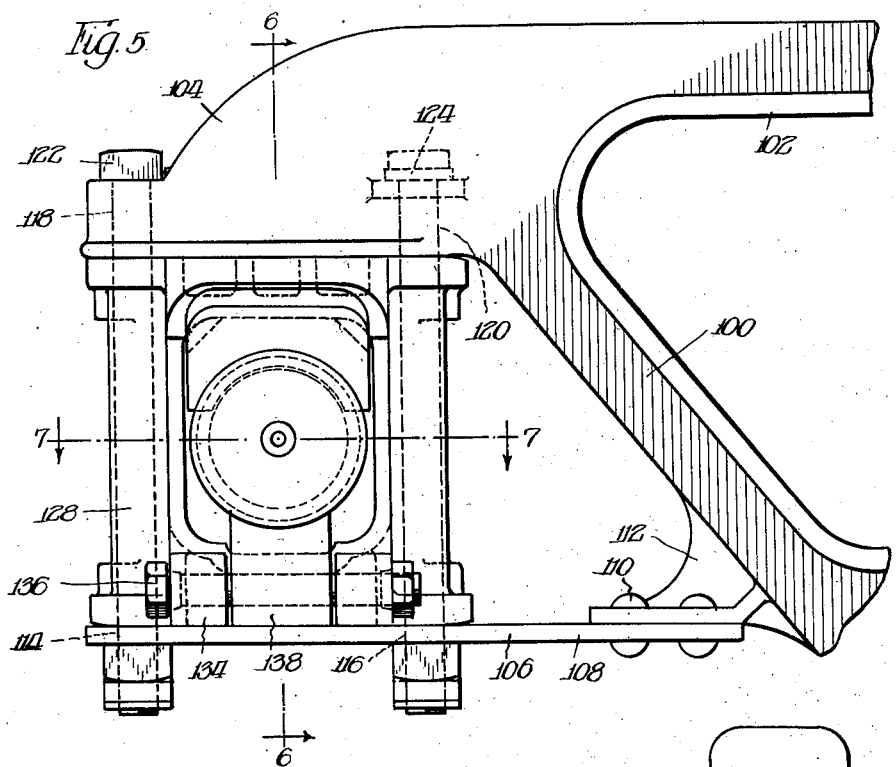
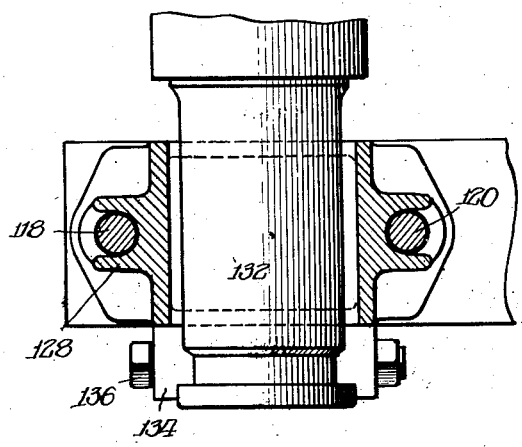
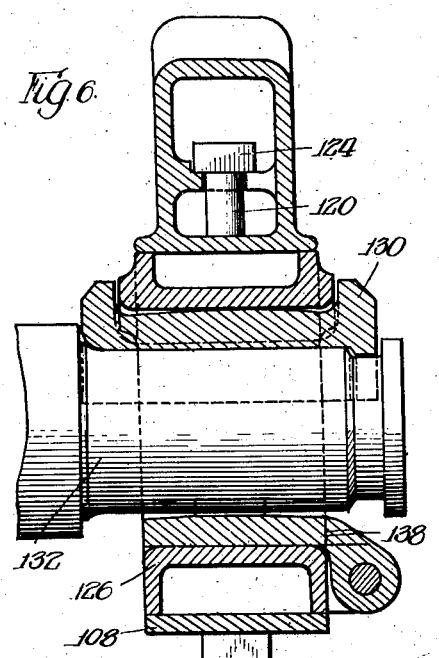
Inventor:
Frederic H. Bender, March 28, 1933.  F. H. BENDER  1,902,823
TRUCK FRAME MOUNTING
Filed March 22, 1929  3 Sheets-Sheet 3
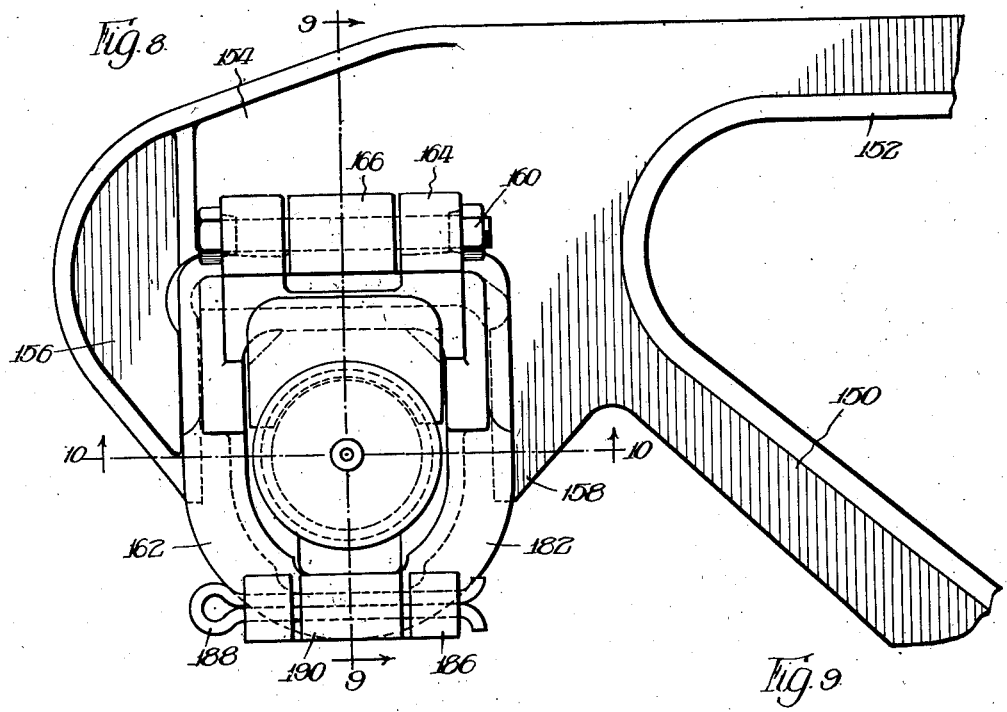
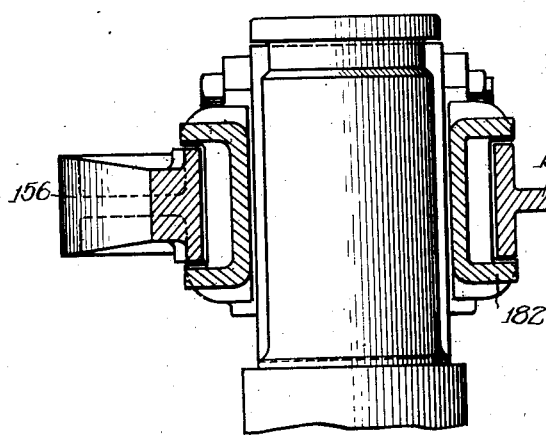
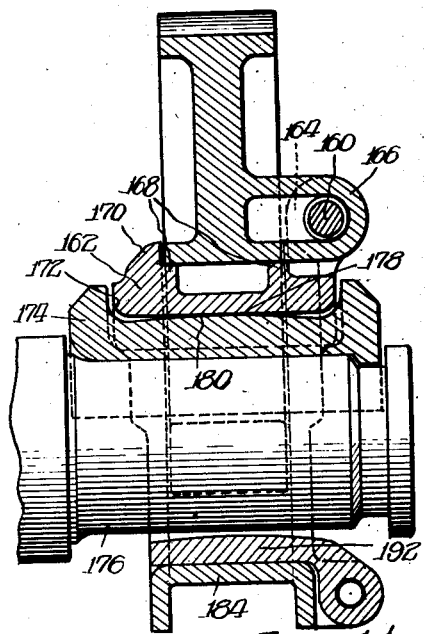
Inventor:
Frederic H. Bender,
By Wilkinson, Huxley, Byron & Knight
Attys.

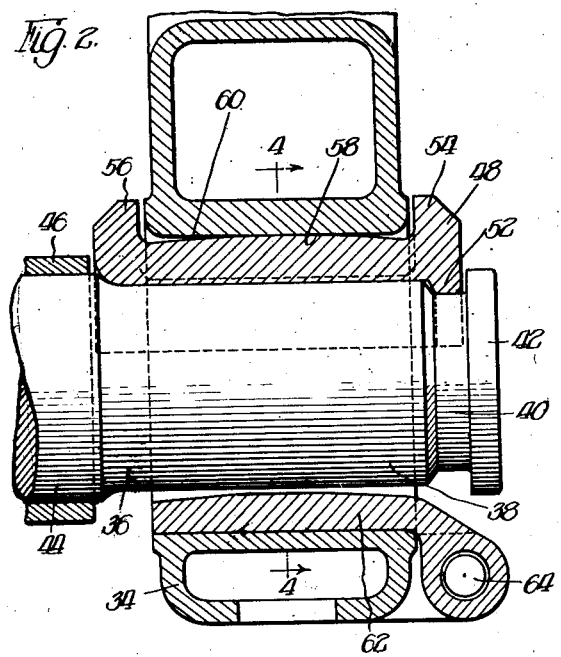
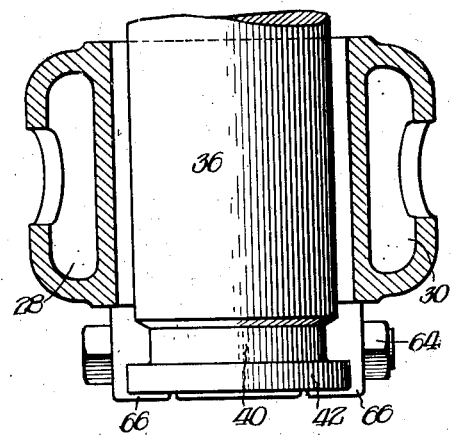
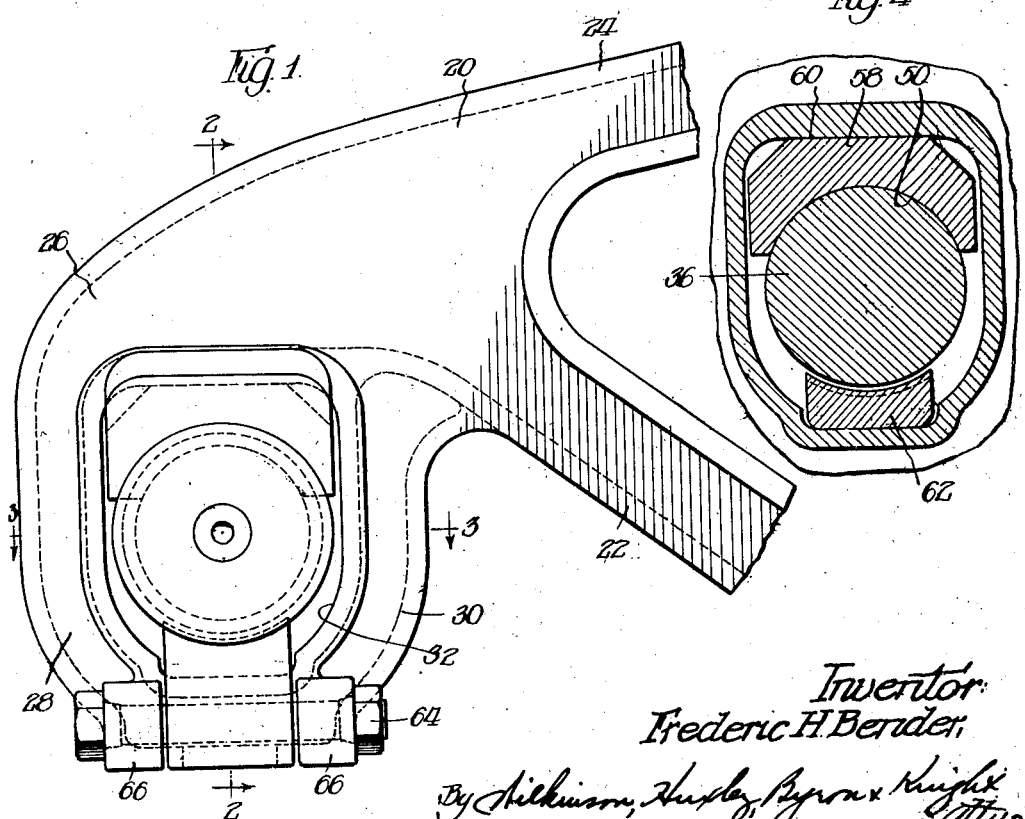

Patented Mar. 28, 1933

1,902,823

UNITED STATES PATENT OFFICE

FREDERIC H. BENDER, OF CHICAGO, ILLINOIS, ASSIGNOR TO AMERICAN STEEL FOUNDRIES, OF CHICAGO, ILLINOIS, A CORPORATION OF NEW JERSEY

TRUCK FRAME MOUNTING

Application filed March 22, 1929. Serial No. 349,217.

This invention pertains to truck frame mountings, and more particularly to retaining mountings on truck frames for roller bearing assemblies.

In roller bearing wheel and axle assemblies of the improved types as shown in application Serial No. 182,734, filed April 11, 1927, there is usually provided an outer revoluble axle upon which the wheels are mounted, an inner normally stationary axle extending through the outer axle and spaced therefrom, and the roller bearings mounted between said axles, it being understood that the inner axle is the one usually supported in the journal boxes or in suitable bearings on the truck side frames or equalizers. As the supported axle is a normally stationary one, it will be appreciated that it is unnecessary to provide a journal box of the usual type in the truck side frames. It must be kept in mind, however, that the roller bearing axle unit is one such that in case of failure or binding of the roller bearing, the inner axle rotates and the bearing between the normally stationary axle and the truck side frame must function as the usual friction bearing.

It is therefore an object of this invention to provide a mounting for the inner axle of a roller bearing assembly such as will permit the side frame to oscillate freely vertically as well as laterally within the usual limits of the axle ends, and in case of emergency will permit the normally stationary axle to rotate on a seat or bearer for performing the function of the usual friction bearing.

Another object is to provide a truck frame mounting for a wheel and axle assembly which will permit the required freedom of movement between the side frame and the axle and will provide effective securing means for the axle permitting ready dismantling for the purpose of applying or removing the wheel and axle assemblies for assembling or repair purposes.

Still another object is to provide a supporting construction adapted for use with roller bearing wheel and axle assemblies and one which may be readily utilized with any type of side frame.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary side elevation of a portion of a truck frame embodying the invention;

Figure 2 is a transverse section through the truck side frame at one end of the axle and at the center thereof, showing the relation between the truck frame and the retaining members to the axle, the same being taken substantially in the plane as indicated by the line 2—2 of Figure 1;

Figure 3 is a sectional top plan view of a portion of the retaining assembly, the same being taken substantially in the plane as indicated by the line 3—3 of Figure 1;

Figure 4 is a sectional end elevation through the retainer and bearer pads of the device, the same being taken substantially in the plane as indicated by the line 4—4 of Figure 2;

Figure 5 is a fragmentary side elevation of one end of an Andrews type side frame, showing the application of the invention thereto;

Figure 6 is a transverse sectional elevation of the modified form of device, the same being taken substantially in the plane as indicated by the line 6—6 of Figure 5;

Figure 7 is a top plan view of the modified form of device, the same being taken substantially in the plane as indicated by the line 7—7 of Figure 5;

Figure 8 is a fragmentary side elevation of a portion of a Vulcan type side frame, showing the application of the invention thereto;

Figure 9 is a transverse sectional elevation of this modified form, the same being taken substantially in the plane as indicated by the line 9—9 of Figure 8; and Figure 10 is a sectional top plan view of this modified form, the same being taken substantially in the plane as indicated by the line 10—10 of Figure 8.

Referring first of all more particularly to the application of the device as shown in Figures 1 to 4 inclusive, the side frame 20 is provided with tension and compression members 22 and 24 merging adjacent their ends into a portion 26, which portion is provided with depending spaced arms 28 and 30 forming a recess 32, said arms being joined at the lower ends thereof by means of a reinforced portion 24. The truck frame and parts thereof may be of any convenient shape and construction, conforming to the practice in frame design. In this structure the inner normally stationary axle 36 is provided with a bearing portion 38 extending through the depending arms or jaws 28 and 30 and terminating in a channel portion 40 determining the enlarged end portion or collar 42, it being seen that the bearing portion 38 merges into the enlarged axle portion 44 provided with the retainer ring 46 shrunk or press fitted in place thereon to maintain the roller bearings in operative adjustment. The bearer pad or bearing 48 is placed directly on the stationary axle and has a cylindrical bearing surface 50 cooperating with the cylindrical bearing surface 38 of the inner axle and on which the weight of the truck frame is transmitted to the axle, and said pad is provided with a depending flange 52 disposed in the groove 40 of the inner axle and also an upstanding flange 54 above the flange 52 and an upstanding flange 56 at the other end of said pad, flanges 54 and 56 embracing a portion of the truck frame to thereby maintain the pad in operative position.

The inner rounded end of the bearer adjacent the flange 56 opposes adjustment of the locking collar to prevent movement of said collar, and as the bearer is held against endwise shifting on the inner axle, there can be no substantial movement of the roller bearings. The upper side of the bearer pad is provided with a crowned surface 58 for permitting rocking movement between the axle and the truck frame, and the side frame has a flat bearing surface 60 which rests directly on the crowned surface 58 of the bearer for permitting this rocking or distortion of the car truck with respect to the axle assemblies.

It will be seen then that when in position the inner axle is prevented by the side frame from shifting endwise in either direction by virtue of contact between the collar or enlarged flange 42, the retainer ring 46 and the flanges 52, 54 and 56 of the bearer. For the purpose of holding the axle in position, a crowned key 62 is provided on the under side of the axle, substantially filling the space between a portion of the side frame 34 and the under side of the axle, this key being secured by a bolt or cotter 64, the outer end of which passes through lugs 66 preferably formed integral with the side frame. The key is removable by withdrawing the cotter or bolt 64, and after the key is withdrawn, the side frame and bearer may be lifted so as to free the axle from the associated parts of the device whereby the bearer assembly readily slips over the end of said axle.

In the modification illustrated in Figures 5 to 7 inclusive, an adaptation is shown as applied to the Andrews type of truck, which truck is provided with the tension and compression members 100 and 102 terminating in an end portion 104. In this type of truck, the journal box is usually secured by bolts in a position between the portion 104 and a bracket structure 106 built up and spaced from the portion 104. This bracket structure may consist of a flat plate 108 riveted or otherwise secured as at 110 to a bracket 112 formed on the tension member 100, the plate 106 being provided with spaced apertures 114 and 116 registering with apertures 118 and 120 formed in the upper part 104 of the truck frame, the apertures being for the purpose of receiving bolts 122 and 124 for securing the journal box in place.

In adapting this type to the bearer and pad arrangement the journal box is replaced by a housing 126, which housing is provided with spaced pedestals 128 adapted to receive the bolts 122 and 124 for bolting said housing in place. The housing in turn mounts the bearer 130 which is of the same shape and cooperates with the inner axle 132 exactly as has already been described with respect to the corresponding parts of the modification illustrated in Figures 1 to 4. In this case, the housing 126 is provided with the lugs 134 for accommodating the bolt or cotter 136 for locking the key 138 in its operative position with respect to the inner axle in a manner as has already been described with respect to Figures 1 to 4, the operation and dismantling being substantially the same.

Referring now more particularly to Figures 8 to 10 inclusive, which illustrate an adaptation of the device to the Vulcan type of frame, as before, the frame is provided with tension and compression members 150 and 152 terminating in an end portion 154, which end portion is provided with spaced jaws 156 and 158 providing pedestals for the usual journal box which is secured by means of a horizontal bolt 160 at its upper end and at the upper ends of the pedestal jaws 156 and 158. In order to accommodate this frame to the bearer and pad construction, a housing 162 is provided and fits between the jaws 156 and 158, said housing being secured by the bolt 160 in the same manner as mounting the journal box, the housing 162 being provided with upwardly extending lugs 164 having apertures therein adapted to register with the slots formed in the lug 166 formed on the side frame. The housing 162 is provided with frame contacting portions 168, a stop portion 170 being provided with the rounded portion 172 cooperating with the corresponding rounded portion provided on the bearer 174.

The bearer 174 is formed in a similar manner as has already been described with respect to Figures 1 and 4, and functions with respect to the inner axle 176 in the same manner. The bearer also functions with respect to the housing in the same manner as has already been described with respect to the form of the modification illustrated in Figures 1 to 4 inclusive, the housing being provided with the flat surface 178 cooperating with a crowned surface 180 of the bearer for permitting rocking movement between the roller bearing assembly and the frame.

The housing is provided with depending portions 182 merging at their bottom portions as at 184, and are provided with lugs 186 adapted to accommodate locking means such as the cotter 188 passing therethrough and through the eye 190 of the inwardly extending key 192, said key being similar and functioning similarly as has already been described with respect to key 62.

The operation of assembling and disassembling the device is substantially the same as has already been described, and it will be seen that with the embodiments of the device illustrated, a very satisfactory and efficient retaining means is provided to replace the usual journal boxes adapted especially to be used in roller bearing assembles.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a side frame, the combination of a journal box receiving portion including spaced jaws defining a seat therebetween, the lower ends of said jaws being connected by a transverse member, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, and a portion received in said channel whereby an interlock is provided between said side frame and axle.

2. In a side frame, the combination of a journal box receiving portion including spaced jaws defining a seat therebetween, the lower ends of said jaws being connected by a transverse member having a channel therein, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, a portion received in said second named channel whereby an interlock is provided between said side frame and axle, and a key supported in said first named channel and disposed between said axle and said transverse member for maintaining said bearing in cooperative relation with said side frame and axle.

3. In a side frame, the combination of spaced jaws, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions interlocking with said side frame and said channel, said bearing having a crowned portion contacting said side frame whereby an equalizer is provided to accommodate axle deflection.

4. In a side frame, the combination of spaced jaws, a member disposed between the lower portions of said jaws and provided with a channel, a normally stationary axle extending through said journal box receiving portion and provided with a channel outwardly of said jaws, a crowned friction bearing received between said jaws and disposed in direct contacting relation to said axle and in direct supporting relation to said side frame on said seat, said bearing having portions interlocking with said side frame and said second named channel, and a key supported in said first named channel and disposed between said axle and said transverse member for maintaining said bearing in cooperative relation with said axle.

5. In a side frame, the combination of a journal box receiving portion including spaced jaws defining a seat therebetween, the lower ends of said jaws being connected by a transverse member, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, and a portion received in said channel whereby an interlock is provided between said side frame and axle.

6. In a side frame, the combination of a journal box receiving portion including spaced jaws defining a seat therebetween, the lower ends of said jaws being connected by a transverse member, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, a portion received in said channel whereby an interlock is provided between said side frame and axle, and a key supported on said transverse member and disposed between said axle and said transverse member for maintaining said bearing in cooperative relation with said side frame and axle.

7. In a side frame, the combination of a journal box receiving portion including spaced jaws defining a seat therebetween, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, and a portion received in said channel whereby an interlock is provided between said side frame and axle.

8. In a side frame, the combination of a journal box receiving portion including spaced jaws defining a seat therebetween, the lower ends of said jaws being connected by a transverse member, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions embracing said side frame, a portion received in said channel whereby an interlock is provided between said side frame and axle, and a key pivoted to said transverse member and supported on said transverse member and disposed between said axle and said transverse member for maintaining said bearing in cooperative relation with said side frame and axle.

9. In a side frame, the combination of spaced jaws, a member disposed between the lower portions of said jaws and provided with a channel, a normally stationary axle extending through said journal box receiving portion and provided with a channel outwardly of said jaws, a friction bearing received between said jaws and disposed in direct contacting relation to said axle and in direct supporting relation to said side frame on said seat, said bearing having portions interlocking with said side frame and said second named channel, said bearing having a crowned portion contacting said side frame whereby an equalizer is provided to accommodate axle deflection, and a key supported in said first named channel and disposed between said axle and said transverse member for maintaining said bearing in cooperative relation with said axle, said key having a crowned surface adjacent said axle to accommodate said deflection.

Signed at Chicago, Illinois, this 16th day of March, 1929.

FREDERIC H. BENDER.